(12) United States Patent
Dorwin

(10) Patent No.: US 10,037,414 B2
(45) Date of Patent: Jul. 31, 2018

(54) ENHANCED USER CONTROL FOR CONTENT PROTECTION SOLUTIONS

(71) Applicant: David Kimbal Dorwin, Kirkland, WA (US)

(72) Inventor: David Kimbal Dorwin, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 365 days.

(21) Appl. No.: 13/723,063

(22) Filed: Dec. 20, 2012

(65) Prior Publication Data
US 2015/0199497 A1 Jul. 16, 2015

(51) Int. Cl.
*G06F 21/10* (2013.01)

(52) U.S. Cl.
CPC ................... *G06F 21/105* (2013.01)

(58) Field of Classification Search
CPC .............. G06F 21/10; G06F 21/128; G06F 2221/07–2221/0797; H04L 2463/101; H04L 2209/60; H04L 2209/603; H04N 21/2541; G06Q 2220/10–2220/18
See application file for complete search history.

(56) References Cited

U.S. PATENT DOCUMENTS

| | | | | |
|---|---|---|---|---|
| 6,948,070 B1 * | 9/2005 | Ginter | ...................... | G06F 21/10 348/E5.006 |
| 7,203,966 B2 * | 4/2007 | Abburi | .................... | G06F 21/10 380/201 |
| 9,129,092 B1 * | 9/2015 | Dorwin | ............... | G06F 21/6209 |
| 2002/0073177 A1 * | 6/2002 | Clark | ....................... | G06F 21/10 709/219 |
| 2002/0184160 A1 * | 12/2002 | Tadayon | ................ | G06Q 10/10 705/54 |
| 2005/0146966 A1 * | 7/2005 | Kawamura | ............. | G06F 21/10 365/222 |
| 2006/0053079 A1 * | 3/2006 | Edmonson | .............. | G06F 21/10 705/59 |
| 2006/0143133 A1 * | 6/2006 | Medvinsky | ............. | G06F 21/10 705/59 |
| 2008/0216177 A1 * | 9/2008 | Yokosato | ................ | G06F 21/10 726/26 |
| 2009/0122991 A1 * | 5/2009 | Kwak | ..................... | G06F 21/10 380/278 |

(Continued)

*Primary Examiner* — Minh Dinh
(74) *Attorney, Agent, or Firm* — Brake Hughes Bellermann LLP

(57) ABSTRACT

This disclosure relates to enhanced user control for content protection solutions. An options component determines or infers a set of digital rights management solutions supported by a content source, and a data component determines or infers information associated with respective digital rights management solutions supported by the content source. The set of digital rights management solutions can further be supported by a client device. A prompt component provides a user a set of digital rights management options based at least in part on the set of digital rights management solutions supported by the content source and the information, and enables the user to select zero or more of the digital rights management options. The content source can enable access for a subset of associated content based at least in part on the selections of the user.

23 Claims, 10 Drawing Sheets

(56) References Cited

U.S. PATENT DOCUMENTS

| | | | | |
|---|---|---|---|---|
| 2010/0198687 A1* | 8/2010 | Bang | ............... | G06F 21/10 |
| | | | | 705/14.53 |
| 2012/0017282 A1* | 1/2012 | Kang | ............... | G06F 21/10 |
| | | | | 726/26 |
| 2012/0090036 A1* | 4/2012 | Kang | ............... | G06F 21/10 |
| | | | | 726/27 |

* cited by examiner

ENHANCED USER CONTROL FOR CONTENT PROTECTION SOLUTIONS

TECHNICAL FIELD

This disclosure generally relates to systems and methods that facilitate enhanced user control for content protection solutions.

BACKGROUND

The Internet and media enabled portable computing devices have dramatically altered the processes for generating and consuming media content. Presently, users can consume media content virtually anywhere at any time, as long as they have access for a media capable device with an Internet connection. The convenience of being able to view media content via the Internet, essentially on demand, has resulted in explosive growth of Internet media consumption. Internet media traffic is currently approaching a majority of consumer Internet traffic, and the rate of demand is projected to continue increasing.

The explosive growth of Internet media traffic is at least partially attributable to the inherent portability of digital media content, and simplicity of accurate reproduction. However, these characteristics also make protecting the rights of digital media content owners challenging. Millions of people around the world have the capability to consume and produce digital media content, and popular online services can receive tens of hours worth of newly uploaded content every minute.

A technique that has been commonly employed by online services to protect media content is requiring consumers to employ a content protection or digital rights management solution that controls consumption and/or usage of the media content. However, content protection and/or digital rights management solutions can have far reaching permissions, and impact portions of a computing system that the user may not expect or understand. Typically, users have little knowledge or control over the invasiveness of a content protection or digital rights management solution required by a content provider.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for enhanced user control for content protection solutions are disclosed. An options component determines or infers a set of digital rights management solutions supported by a content source (supported digital right management solutions), and a data component determines or infers information associated with respective supported digital rights management solutions. The set of digital rights management solutions can further be those supported by a client device. A prompt component provides a user a set of digital rights management options based at least in part on the set of digital rights management solutions supported by a content source and the information, and enables the user to select zero or more of the digital rights management options. The content source can enable access for a subset of associated content based at least in part one the selections of the user.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
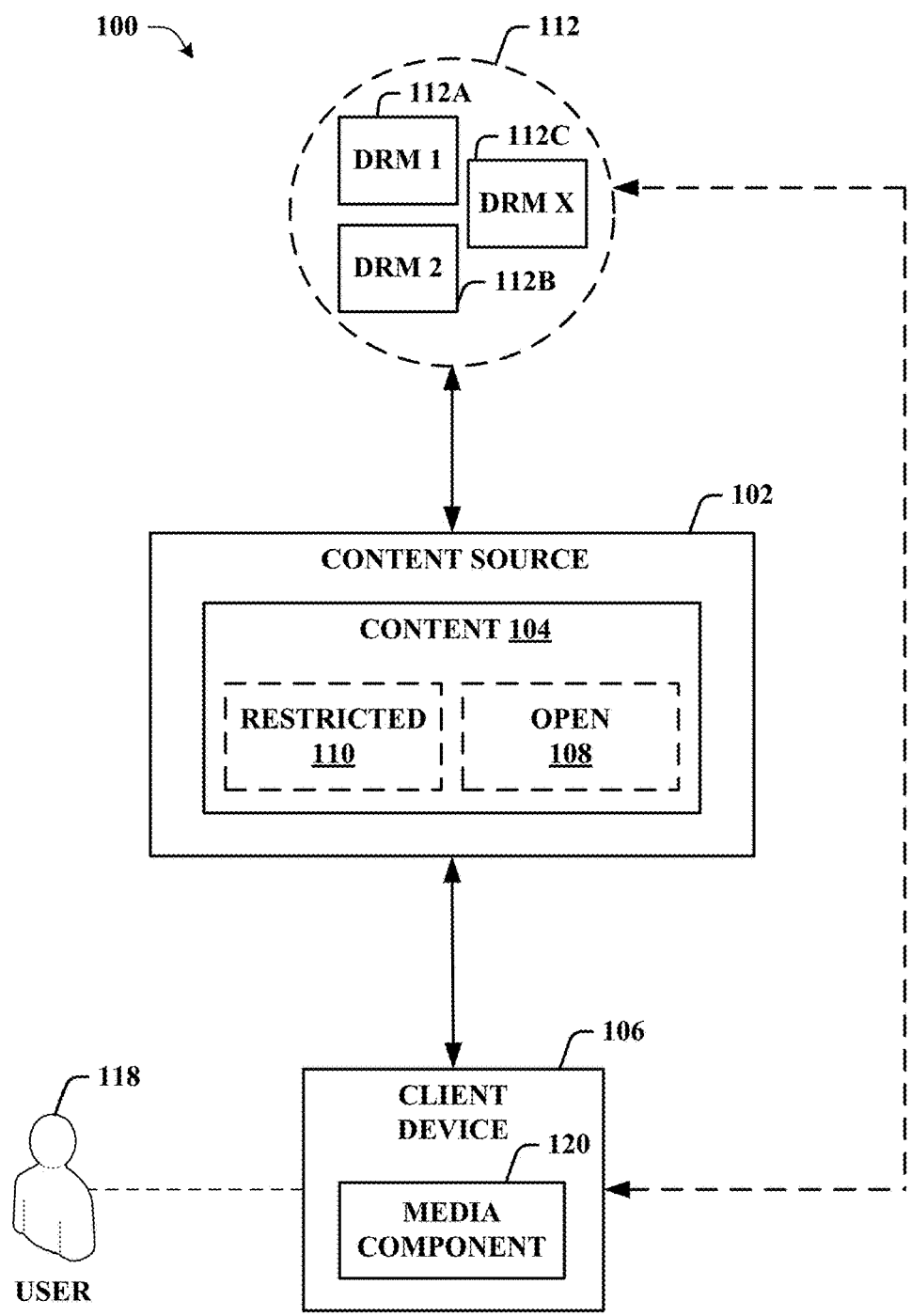
FIG. 1 illustrates an example system for enhanced user control for content protection solutions in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can opt-in or opt-out of providing personal information, demographic information, location information, proprietary information, sensitive information, or the like in connection with data gathering aspects. Moreover, one or more implementations described herein can provide for anonymizing collected, received, or transmitted data.

Online services often require consumers to employ a content protection or digital rights management (DRM) solution in order to control consumption and/or usage of media content. In one example, a client device can include one or more DRM solutions which can be available, for example, to a browser (or other client software) of the client device. The DRM solutions can be, for example, pre-installed with an operating system of the client device, installed as part of the browser (or other client software), or otherwise obtained. In such a scenario, a user may not be aware that the DRM solutions are installed on the client device and/or may not be aware how installation of the DRM solutions on the client device affect the client device and/or user experience.

To that end, techniques for enhancing user control for content protection solutions are presented. For example, information associated with different content protection solutions (e.g., type(s) of media content and/or catalog(s) of media content available to a user for each content protection solution, etc.) can be provided to a user. As such, a user can select a particular content protection solution based at least in part on the information associated with the different protection solutions. One non-limiting implementation of this disclosure provides for accurate and efficient enhanced user control for content protection solutions. More particularly, in accordance with an embodiment, an options component determines or infers a set of digital rights management solutions supported by a content source, a data component determines or infers information associated with respective digital rights management solutions included in the set of digital rights management solutions supported by the content source, and a prompt component provides to a user, based at least in part on the set of digital rights management solutions, a set of digital rights management options and the associated information, and enables the user to select zero or more of the digital rights management options.

Non-Limiting Examples of Systems for Enhanced User Control for Content Protection Solutions Turning now to FIG. 1, illustrated is an example system 100 for enhanced user control for content protection solutions in accordance with various aspects described in this disclosure. System 100 includes a content source 102. The content source 102 (e.g., content provider, server, website, etc.) publishes, streams, or otherwise provides media content (content) to client devices (e.g., client device 106). For example, in one implementation, the content source 102 streams content included in a set of content 104 to a client device (e.g., user device) 106, e.g., using a network connection. The set of content 104 can include but is not limited to videos, music, electronic books (e-books), video games, websites, and/or articles. In addition, respective content in the set of content 104 may be characterized based in part on ownership rights of the content. For instance, the characterizations can include but are not limited to open content 108 (e.g., user-generated content, license free content, etc.), and/or restricted content 110 (e.g., copyright protected content, etc.). It is to be appreciated that although the set of content 104 is illustrated as being included in the content source 102 such implementation is not so limited. For example, the set of content 104 can be included in a different location, and the content source 102 can access the set of content 104, e.g., using a network connection.

The content source 102 controls, restricts, or otherwise manages access by users (e.g., user 118) to content included in the set of content 104 based in part on a set of digital rights management (DRM) solutions employed by a client device 106 and/or a media component 120. For example, in one implementation, the content source 102 accepts or supports a set of DRM solutions 112 (supported DRM solutions) (e.g., DRM 112A-C), and enables access for subsets of the content 104 for respective supported DRM solutions 112. For instance, the content source 102 can enable access for a first subset of the restricted content 110, where a first DRM solution 112A is employed by the client device 106 and/or media component 120, and the content source 102 can enable access for a second subset of the restricted content 110, where a second DRM solution 112B is employed.

The DRM solutions 112 control reproduction and/or use (e.g., viewing, copying, sharing, printing, modifying, etc.) of associated content. For example, in one implementation, the content source 102 provides respective content in the set of restricted content 110 to the user 118 as a set of encrypted data (file, etc.), and the first DRM solution 112A provides the user 118 and/or content source 102 a key for decrypting the set of encrypted data. Aspects of the invention are not limited to a quantity of DRM solutions supported by the content source 102, and/or employed by the client device 106 and/or media component 120. For example, X DRM solutions can be supported and/or employed, where X is a positive integer. In addition, it is to be appreciated that although the DRM solutions 112 are illustrated as stand-alone components, such implementation is not so limited. For example, the DRM solutions 112 can be included in the content source 102, the client device 106, and/or in another location where the content source 102 and/or client device 106 can communicate with the DRM, e.g., using a network connection.

The client device 106 can include but is not limited to a smart phone, a cell phone, a personal digital assistant (PDA), a tablet, a laptop, a desktop, a portable music player, a video game system, an electronic reader (e-reader), a global positioning system (GPS), a set-top box, and/or a television. The client device 106 includes a media component 120. The media component 120 provides for display, presentation, or what is referred to for the purposes of this disclosure as playback or play of media content via the client device 106. The media component 120 can include but is not limited to an Internet browser (browser), a media player, an operating system, and/or an application (app). For example, in one implementation, the media component 120 receives encrypted content (e.g., restricted content 110) streamed from the content source 102, and receives a key associated with the encrypted content from a DRM 112 and/or the content source 102. The media component 120 decrypts and/or decodes the encrypted content using the associated key with the DRM 112, and plays the decrypted (and/or possibly decoded) content via the client device 106.

A set of DRM options are presented to the user 118 based in part on the set of supported DRM solutions 112. For example, in one embodiment, if a content source 102 requires use of a supported DRM solution 112, the media component 120 provides the client device 106 a set of DRM options based in part on the set of supported DRM solutions 112, and a set of information related to the respective DRM options. As an additional or alternative example, in one embodiment, the media component 120 provides the user 118 a set of DRM options based on a subset of the supported DRM solutions 112 (e.g., supported DRM options) that are allowed by the client device 106 and/or media component 120. For instance, the user 118 may set, select, or otherwise predetermine a set of DRM solutions (e.g., default DRM solutions) that are allowed by the client device 106 (allowed DRM solutions). Providing the user 118 the set of DRM options and related information can include but is not limited to prompting the user to select zero or more of the supported DRM solutions 112, and/or a subset of features (e.g., levels, etc.) associated with respective supported DRM solutions 112. The information related to respective DRM solutions can include but is not limited to an invasiveness measurement, a set of security policies and/or implications, a set of privacy policies, a set of limitations (content qualities, etc.), a set of compatibility data, and/or a set of permissions required for respective supported DRM solutions. It is to be appreciated that although the media component 120 is illustrated as being included in the client device 106; such implementation is not so limited. For instance, the media component 120 can be included in the content source 102, a cloud server, and/or can be a standalone component that the client device 106 can access, e.g., using a network connection.

Figure 2:
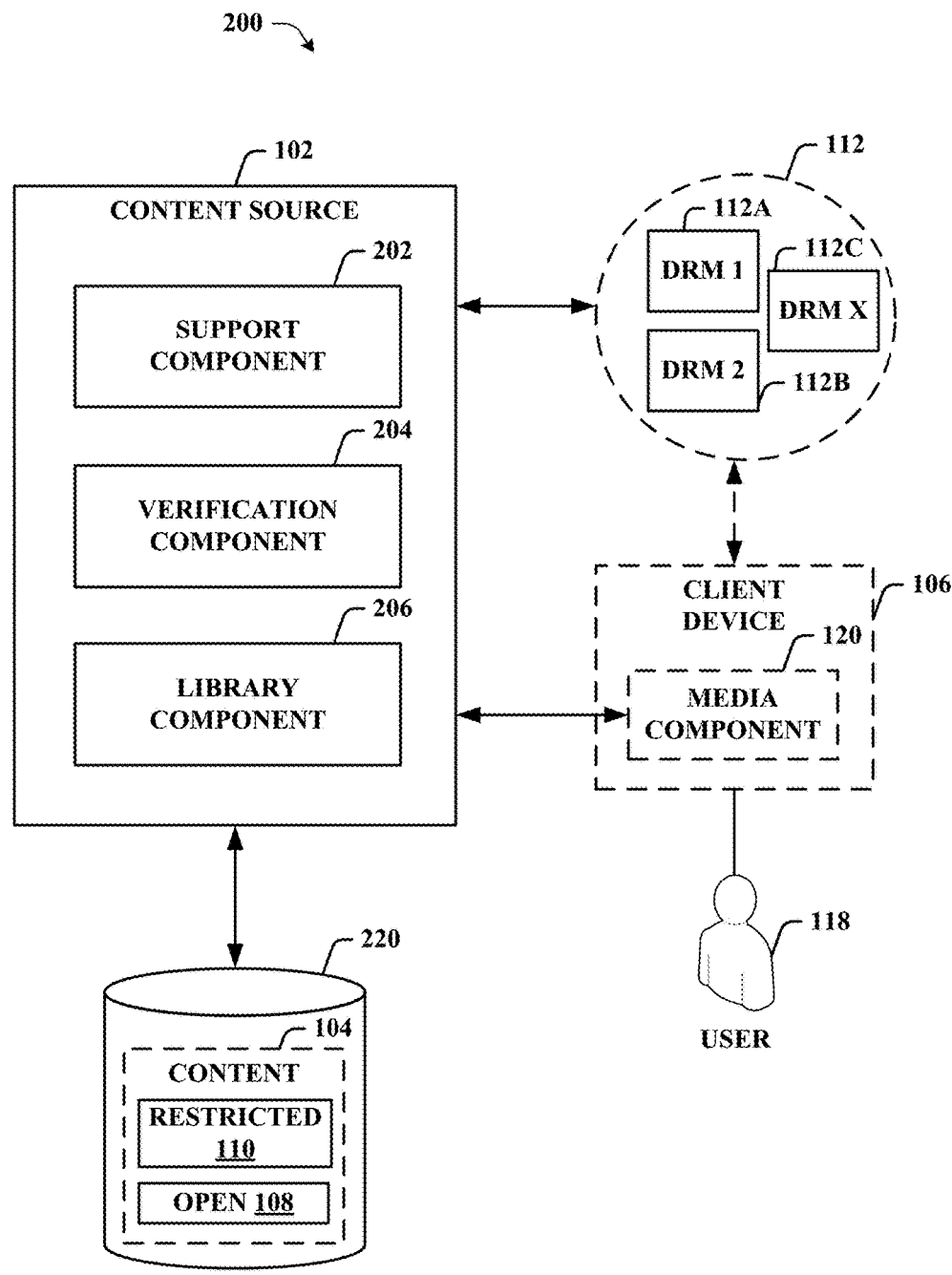
FIG. 2 illustrates an example content source in accordance with various aspects described in this disclosure.

FIG. 2 illustrates a non-limiting implementation of a system 200 with an example content source 102 in accordance with various aspects described in this disclosure. Generally, the content source 102 can include a memory that stores computer executable components and a processor that executes computer executable components stored in the memory, examples of which can be found with reference to FIG. 10. As discussed, the content source 102 provides media content (content) to client devices (e.g., client device 106). For example, in one implementation, the content source 102 streams content included in a set of content 104 to a client device 106. The content source 102 manages access for the content 104 based in part on a set of digital rights management (DRM) solutions employed by a media component 120 associated with the client device 106. For example, in one implementation, the set of content 104 can include content characterized as open content 108, and/or restricted content 110. The content source 102 enables access for respective content characterized as restricted content 110 based in part on a corresponding DRM solution being employed by the media component 120. The content source 102 in FIG. 2 includes a support component 202, a verification component 204, and a library component 206.

The support component 202 notifies or informs media players (e.g., media component 120) of a set of DRM solutions 112 (e.g., DRM 112A-112C) supported (supported DRM solutions) by the content source 102, and/or a set of access rights corresponding to respective supported DRM solutions 112. For example, in one implementation, the support component 202 can initiate communication of a list of supported DRM solutions (e.g., DRM 112A-C) 120 and associated access rights to the media component 120, when the media component 120 accesses or connects with the content source 102 and/or content included in the set of content 104. The access rights can include but are not limited to content limitations, quality limitations, (e.g., high definition, standard definition, etc.), and/or device limitations. The content limitations specify, identify, or otherwise indicate subsets of the content 104 that the content source 102 enables access for based in part on the DRM solutions 112 employed by the media component 120. The quality limitations indicate qualities (e.g., standard definition (SD), high definition (HD), 3-Dimensional (3D), higher frame rate, etc.) of the content 104 for which the content source 102 enables access, based in part on the DRM solutions 112 employed by the media component 120. The device limitations indicate devices (e.g., mobile phone A, etc.) and/or a set of predetermined device types (e.g., laptop, desktop, etc.) for which the content source 102 enables access based in part on the DRM solutions 112 employed by the media component 120. Additionally or alternatively, the support component 202 compares a set of supported DRM solutions against a set of DRM solutions allowed (e.g., installed, supported, selected, configured, etc.) by the client device 106 and/or media component 120 (allowed DRM solutions, default DRM solutions, or preset DRM solutions).

As discussed, the user 118 can select a supported DRM solution 112 and/or a subset of features associated with a supported DRM solution 112 for employment by the client device 106 and/or media component 120. For instance, the user 118 may select a first supported DRM solution 112A, because the content source 102, in response to selection of the first supported DRM solution 112A, enables access for a subset of the restricted content 110 that the user 118 desires to consume. Additionally or alternatively, the user 118 may predetermine a set of DRM solutions 112 (e.g., a set of default DRM solutions 112) allowed for the client device 106 and/or media component 120 (allowed DRM solutions 112), and the support component 202 can select one or more of the allowed DRM solutions 112 (e.g., select from the predetermined set of DRM solutions 112 chosen by the user 118) for provisioning of content 104 based in part on a set of selection criteria. The selection criteria can include but is not limited to a ranking, a hierarchy, and/or correspondence to a supported DRM solution 112. The verification component 204 confirms, validates, or otherwise verifies that a supported DRM solution 112 is active or employed on the client device 106. For example, in one implementation, the verification component 204 can acquire, obtain, or otherwise receive an active DRM verifier (e.g., indicator, etc.) from the client device 106 and/or corresponding supported DRM solution 112.

The library component 206 provides, allows, or otherwise enables, based in part on supported DRM solutions 112 employed by the media component 120, access for subsets of the content 104. For instance, where a first supported DRM solution 112A is employed, the library component 206 can enable access for a first subset of the restricted content 110. As an additional or alternative example, where a second supported DRM solution 112B is employed, the library component 206 can enable access for a first quality (e.g., 1080p) of the restricted content 110. As yet another example, where a third supported DRM solution 112C is employed, the library component 206 can enable access for the set of restricted content 110 for one or more predetermined device types. It is to be appreciated that although the set of content 104 is illustrated as being included in a data store 220 such implementation is not so limited. For example, the set of content 104 can be included in the content source 102, and/or different locations where the content source 102 can access the set of content 104, e.g., using a network connection.

Figure 3:
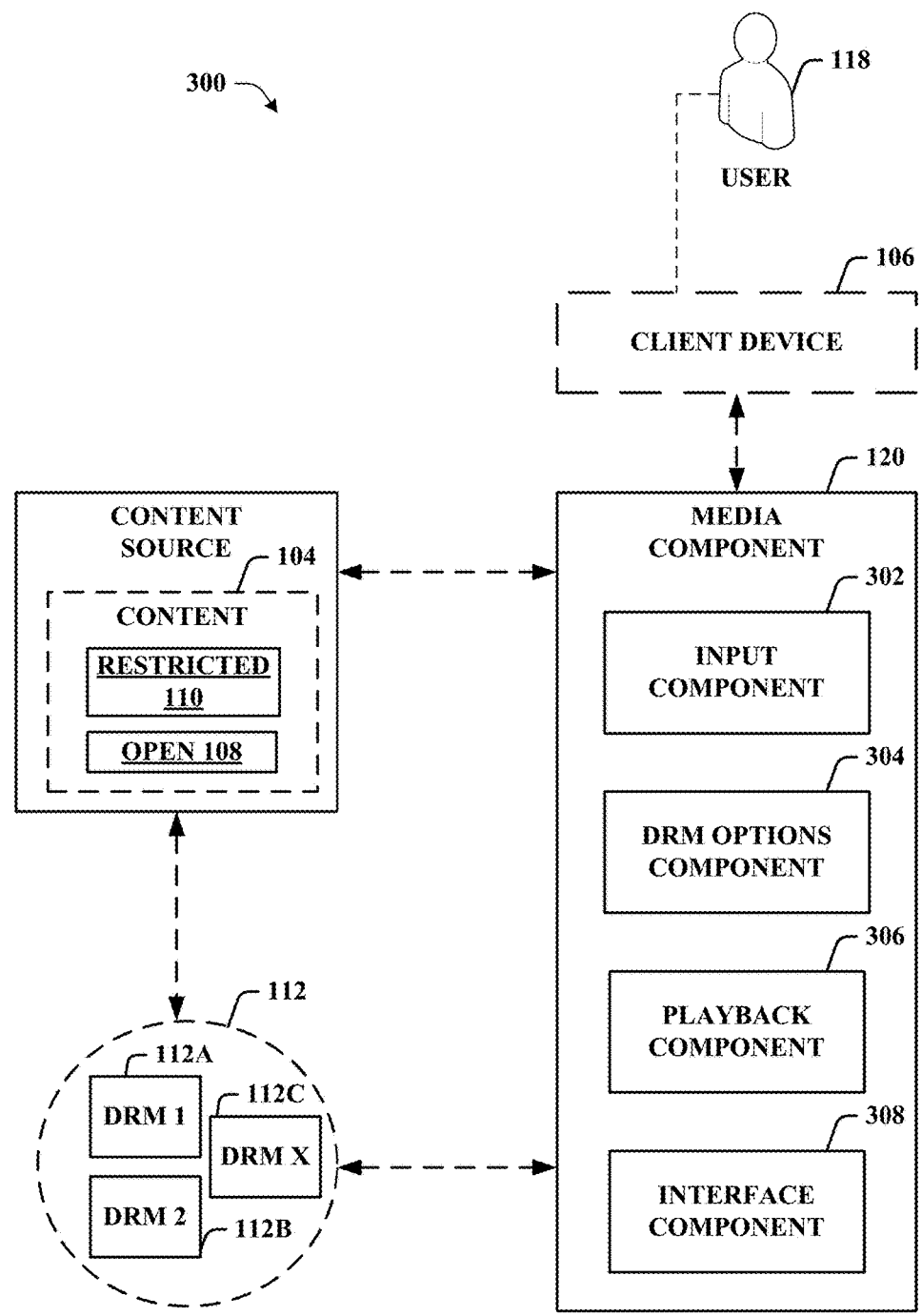
FIG. 3 illustrates an example media component in accordance with various aspects described in this disclosure.

FIG. 3 illustrates a non-limiting implementation of a system 300 with an example media component 120 in accordance with various aspects described in this disclosure. Generally, the media component 120 can include a memory that stores computer executable components and a processor that executes computer executable components stored in the memory, examples of which can be found with reference to FIG. 10. As discussed, the media component 120 provides for playback or play of media content via a client device 106. The media component 120 can include but is not limited to an Internet browser (browser), a media player, an operating system, and/or an application (app). For example, in one implementation, the media component 120 receives encrypted content (e.g., restricted content 110) streamed from the content source 102, and receives a key from a corresponding supported DRM solution 112 and/or the content source 102. The media component 120 decodes the encrypted content using the key, and plays the decrypted content via the client device 106. The media component 120 provides the user 118 a set of DRM options based in part on a set of supported DRM solutions 112, a set of allowed DRM solutions 112, and/or a set of information related to respective DRM solutions 112. The media component 120 in FIG. 3 includes an input component 302, a digital rights management options component 304 (DRM options component 304), a playback component 306, and an interface component 308.

The input component 302 obtains, acquires, or otherwise receives input from a user 118. The inputs can include explicit user inputs (e.g., configuration selections, question/answer, etc.) such as from mouse selections, keyboard entries, touch screen selections, and/or speech. For example, in one implementation, the input component 302 detects keyboard and/or mouse commands entered by the user 118, via the client device 106, in response to a DRM selection prompt (discussed in greater detail with reference to FIG. 6). For instance, the inputs can instruct the media component 120 to activate or employ a supported DRM solution 112. As an additional or alternative example, the user 118 can select a set or predetermine (e.g., via a preferences menu or control panel) a set of DRM solutions 112 (e.g., a set of default DRM solutions 112) to be allowed and/or employed by the client device 106 and/or media component 120 (allowed DRM solutions) via the input component 302. For instance, the user 118 can set the DRM solutions (e.g., the default DRM solutions) as preferences. Furthermore, the user 118 can be provided with, for example, a description of one or more outcomes associated with a particular DRM option via the DRM options component 304.

The DRM options component 304 provides the user 118 information associated with respective DRM options, and prompts the user 118 to select zero or more of the DRM options (discussed in greater detail with reference to FIG. 4). For example, in one implementation, the DRM options include subsets of features associated with supported DRM solutions 112. For instance, a first subset of features can be determined based on a set of user preferences and/or client device 106 settings. The information can include but is not limited to an invasiveness measurement, a set of security policies and/or implications, a set of privacy policies, a set of limitations (e.g., content limitations, quality limitations, and/or device limitations), a set of compatibility data, and/or a set of permissions required for respective supported DRM solutions (e.g., root access, etc.). The invasiveness measurement can include but is not limited to a grade, a rank, and/or a numerical score of the invasiveness of a DRM solution. The set of privacy policies can include but are not limited to policies associated with a DRM solution regarding user and/or client device information (e.g., account, unique identifier, etc.) sharing and/or transmission. The set of compatibility data can include but is not limited to data regarding compatibility of respective DRM solutions with other content sources, and/or compatibility of respective DRM solutions with the client device 106. The information associated with respective DRM options can be based on data obtained from a server (e.g., content source 102 or content provider) and/or determined by the client device and/or media component 120.

The playback component 306 provides for playback of enabled content via the client device 106. The enabled content can include but is not limited to content included in the set of content 104 that the content source has enabled access based on the set of DRM solutions employed by the media component 120. For example, in one implementation, the user 118 can select an Internet video included in a set of enabled content to stream (e.g., using the input component 302), and the playback component 306 provides for displaying the streaming Internet video to the client device 106. Aspects of the invention are not limited to a particular display of the content, and the display can be adapted based on the client device 106 and/or content. As discussed, the media component 120 can decode encrypted restricted content 110 using a key provided from an associated DRM solution 112 and/or the content source 102.

The interface component 308 includes any suitable and/or necessary adapters, connectors, channels, communication paths, etc. to enable the media component 120 to communicate with any suitable operating, search, data feed, and/or database system(s). Moreover, the interface component 308 provides various adapters, connectors, channels, communication paths, etc., that provide for interaction with the media component 120. For example, the interface component 308 can facilitate communication with the content source 102 and/or the supported DRM solutions 112.

Figure 4:
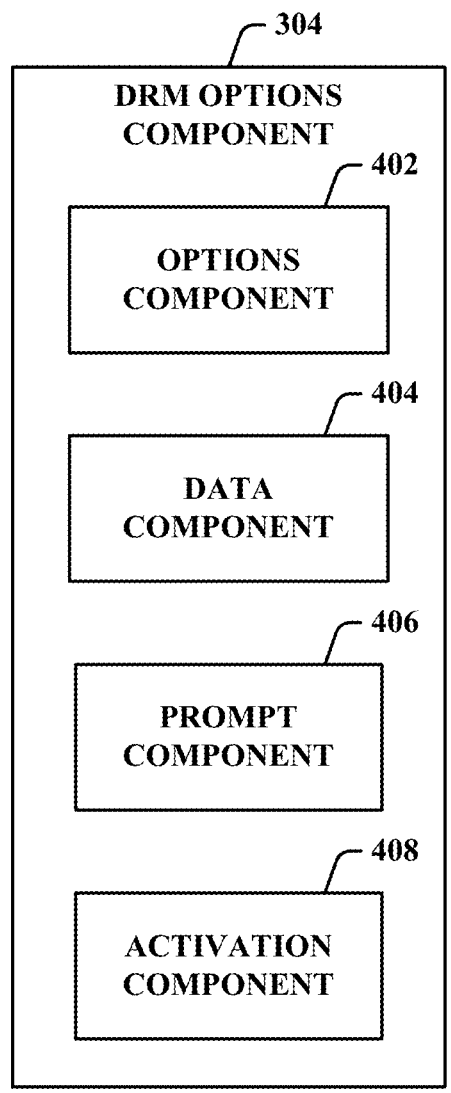
FIG. 4 illustrates an example digital rights management component in accordance with various aspects described in this disclosure.

Turning now to FIG. 4, illustrated is an example digital rights management component (DRM options component 304) in accordance with various aspects described in this disclosure. As discussed, the DRM options component 304 provides a user (e.g., user 118) information associated with respective DRM options, and prompts the user to select zero or more of the DRM options. The DRM options component 304 in FIG. 4 includes an options component 402, a data component 404, a prompt component 406, and an activation component 408. The options component 402 determines or infers a set of DRM solutions (e.g., DRM solutions 112) supported by a content source. For example, in one implementation, the options component 402 obtains, acquires, or otherwise receives a set or list of supported DRM solutions (e.g., from the content source). As an additional or alternative example, the options component 402 determines or infers a set of supported DRM solutions based on a set of support criteria. The set of support criteria can include but is not limited to a format of media content associated with the content source (content format), a type of encryption employed for content associated with the content source (encryption type), and/or an identity of the content source. For instance, the options component 402 can inspect content associated with the content source, determine an encryption type for the content, and based on the encryption type determine a set of supported DRM solutions.

The data component 404 determines or infers information associated with respective supported DRM solutions. The information can include but is not limited to an invasiveness measurement, a set of security policies and/or implications, a set of privacy policies, a set of limitations, a set of compatibility data, and/or a set of permissions required for respective supported DRM solutions. For example, in one implementation, the data component 404 receives the information associated with a supported DRM solution from a content source and/or the supported DRM solution. As an additional or alternative example, in one implementation, the data component 404 determines or infers the information based on a set of information criteria. The set of information criteria can include but is not limited to an identity of a DRM, a DRM type, files associated with a DRM, and/or execution of the DRM on the client device. For example, in one implementation, the data component 404 can determine information associated with a supported DRM solution based on a set of installation or executable files associated with the DRM. For instance, the data component 404 can determine that the supported DRM solution requires root access (e.g., set of permissions required) based on a set of executable files associated with the DRM. In one example, the data component 404 can determine one or more permissions required by a set of sandbox permissions and/or a set of application programming interfaces (APIs). For example, the data component 404 can determine a supported DRM solution (and/or an allowed DRM solution) by examining and/or acquiring information (e.g., data) from a set of sandbox permissions and/or a set of APIs.

The prompt component 406 provides a user the set of DRM options (e.g., determined using the options component 402), information associated with respective DRM options (e.g., determined using the data component 404), and prompts the user to select zero or more of the DRM options. For instance, the information associated with a first DRM option can indicate that a first supported DRM solution transmits a unique identifier associated with the user and/or client device to a DRM server (e.g., privacy policy), requires root access (e.g., set of permissions required), and will enable access for a first subset of content (e.g., content limitations).

The activation component 408 installs, executes, or otherwise employs DRM options selected by the user (e.g., using the prompt component 406). For instance, the activation component 408 can enable a first DRM option selected by the user and/or disable a set of DRM options not selected by the user. In addition, the activation component 408 can inform the content source of the user selections. For instance, the activation component 408 can communicate the zero or more DRM options selected by the user (e.g., via an active DRM message) to the content source. It is to be appreciated that although the options component 402, data component 404, prompt component 406, and activation component 408 are illustrated as being included in the DRM options component 304, such implementation is not so limited. For example, the options component 402, data component 404, prompt component 406, and/or activation component 408 can be maintained in a different location, and the DRM options component 304 can access the options component 402, data component 404, prompt component 406, and/or activation component 408, e.g., using a network connection.

Figure 5:
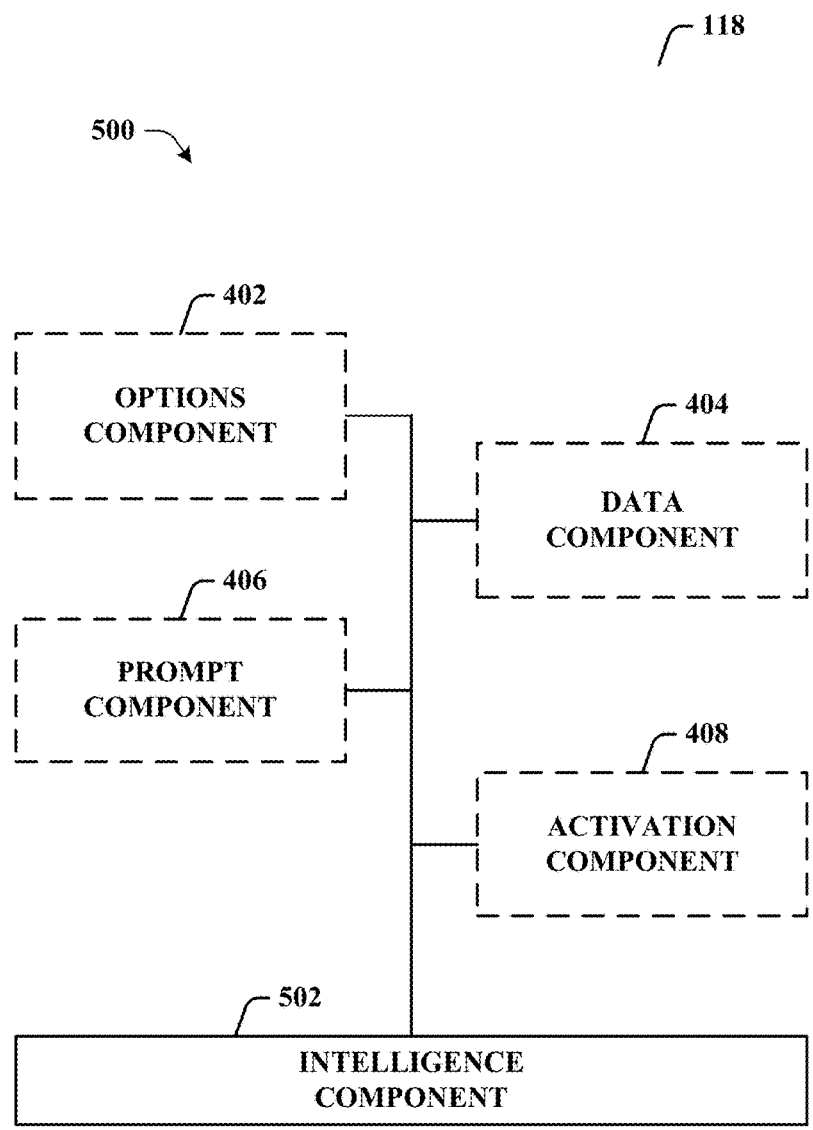
FIG. 5 illustrates an example system for enhanced user control for content protection solutions in accordance with various aspects described in this disclosure.

FIG. 5 illustrates an example system 500 that employs an intelligence component 502 that facilitates enhanced user control for content protection solutions in accordance with various aspects described in this disclosure. For example, all or portions of the options component 402, data component 404, prompt component 406, and/or activation component 408 are operatively coupled to intelligence component 502. Additionally or alternatively, all or portions of intelligence component 502 may be included in one or more components described in this disclosure. The intelligence component 502 can provide for or aid in various inferences or determinations. For example, in one implementation, the intelligence component 502 facilitates inferring supported DRM solutions for a content source and/or information associated with respective supported DRM solutions. As discussed, the data component 404 determines or infers sets of data or information associated with respective DRM solutions based on a set of information criteria. The intelligence component 502 can infer or determine additional information criteria.

Accordingly, in order to provide for or aid in the numerous inferences described in this disclosure, intelligence component 502 examines the entirety or a subset of the data available and provides for reasoning about or infer states of the system, environment, client, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, X2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is used to develop models of priority.

Figure 6:
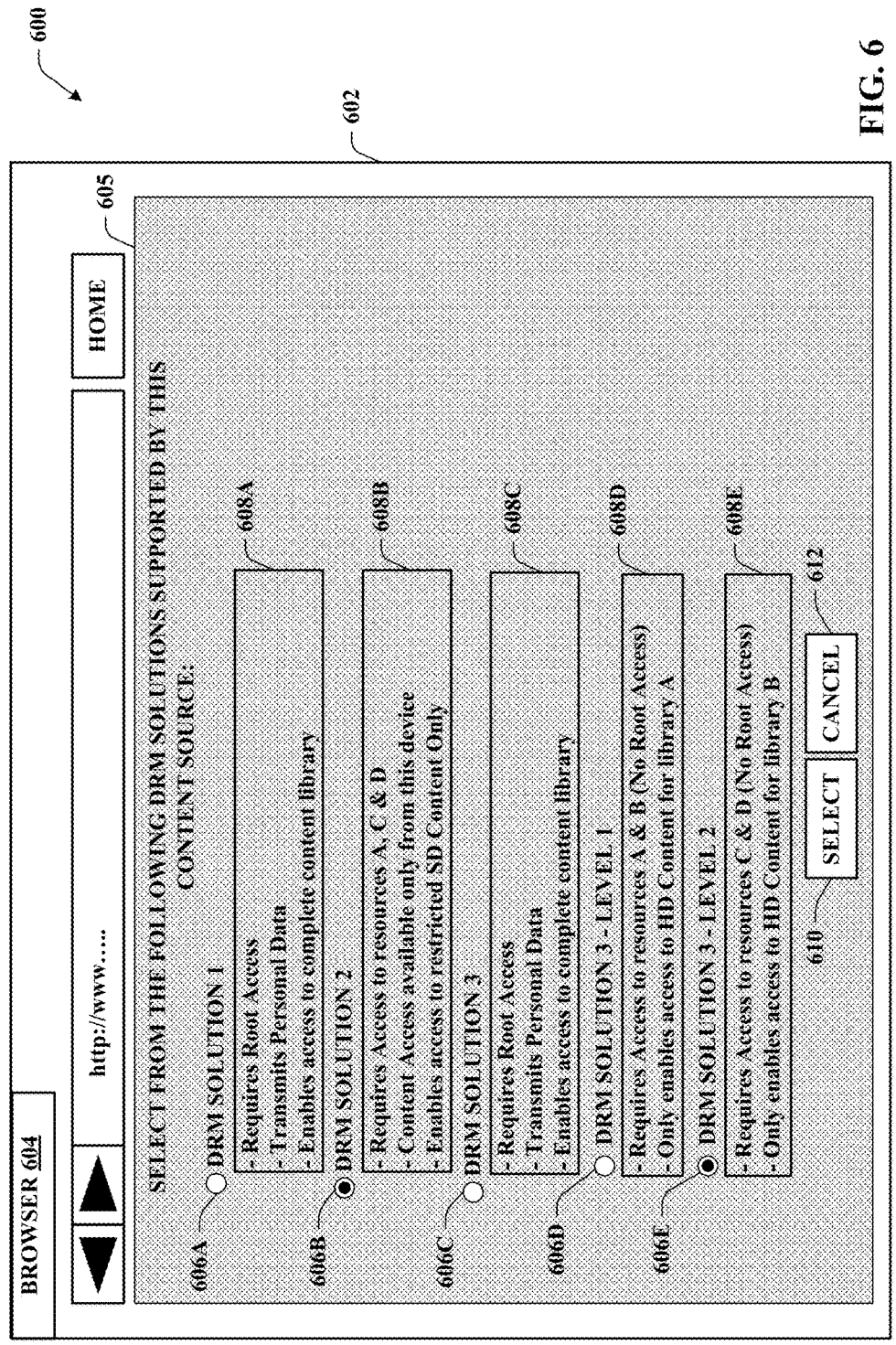
FIG. 6 illustrates a system that provides a non-limiting example of a user interface in accordance with various aspects described in this disclosure.

Non-Limiting Examples of a User Interface for Enhanced User Control for Content Protection Solutions Referring to FIG. 6, illustrated is a system 600 that provides a non-limiting example of a user interface 602 in accordance with various aspects described in this disclosure. The interface 602 can include a media player 605 (e.g., media component 120) included in an Internet browser 604. The media player 605 includes a set of digital rights management (DRM) options 606. As discussed, the DRM options can include supported DRM solutions (e.g., DRM options 606A-C), and/or a subset of features associated with supported DRM options (e.g., DRM options 606D-E). For example, the set of DRM options 606 can be obtained, acquired, or otherwise received from a content source (e.g., using the options component 402) and/or determined by the media player 605 (e.g., media component 120). As an additional or alternative example, the set of DRM options 606 are determined or inferred based on a set of support criteria (e.g., using the options component 402). The set of support criteria can include but is not limited to a content format, an encryption type, and/or an identity of the content source.

The media player 605 also includes sets of information 608 (e.g. 608A-C) associated with respective DRM options 606. The sets of information 608 can include but are not limited to an invasiveness measurement, a set of security policies and/or implications, a set of privacy policies, a set of limitations, a set of compatibility data, and/or a set of permissions required for respective DRM options 606. The sets of information 608 are obtained, acquired, or otherwise received from the content source supported DRM solutions, and/or media player 605. As an additional or alternative example, in one implementation, the sets of information 608 are determined or inferred based on a set of information criteria. The set of information criteria can include but is not limited to an identity of a DRM, a DRM type, files associated with a DRM, and/or execution of the DRM on the client device 106.

A user (e.g., user 118) can choose, activate, or otherwise select zero or more of the DRM options 606. For instance, the user may select a second DRM option 606B, because the user desires to consume restricted content, but does not desire to employ a DRM solution that requires root access (e.g., DRM solution A). The user may also select a fifth DRM option 606E, because the fifth DRM option enables access for HD content for a subset of content associated with the content source (e.g., information 608E), but does not require root access. The media player 605 also includes a select button 610 that will implement the user selections, and a cancel button 612 that will activate none of the DRM options 606. For instance, upon viewing the information 608 associated with the respective supported DRM options 606, the user can select not to select a DRM solution and/or consume content from the content source using the cancel button 612. It is to be appreciated that aspects of the innovation are not limited to an implementation or display of the media player 605. For example, the media player 605 can be included in or associated with a stand-alone media player, and/or an application. In addition, the display can be adapted based on a device and/or the media player 605.

Figure 7:
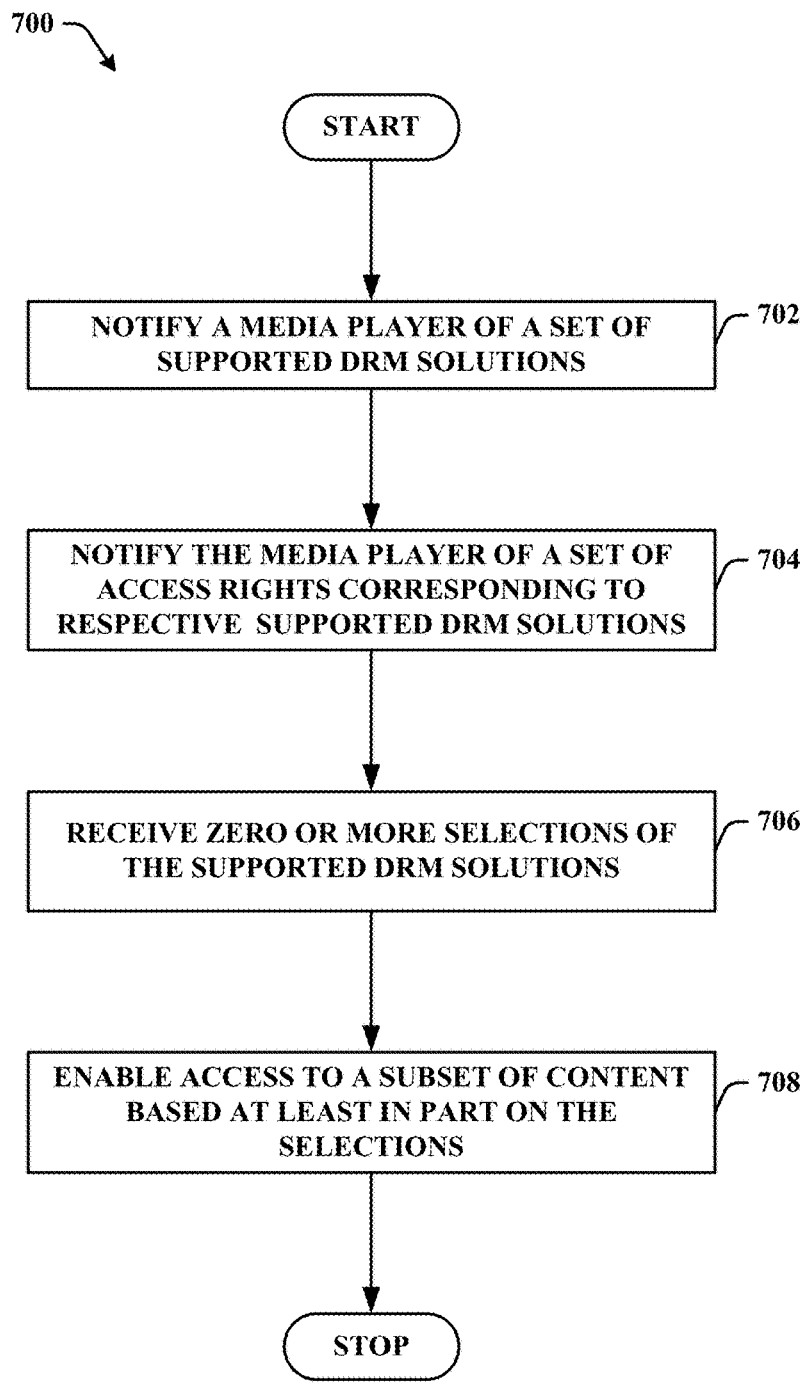
FIGS. 7-8 are example flow diagrams of respective methodologies for enhanced user control for content protection solutions in accordance with various aspects described herein.
Figure 8:
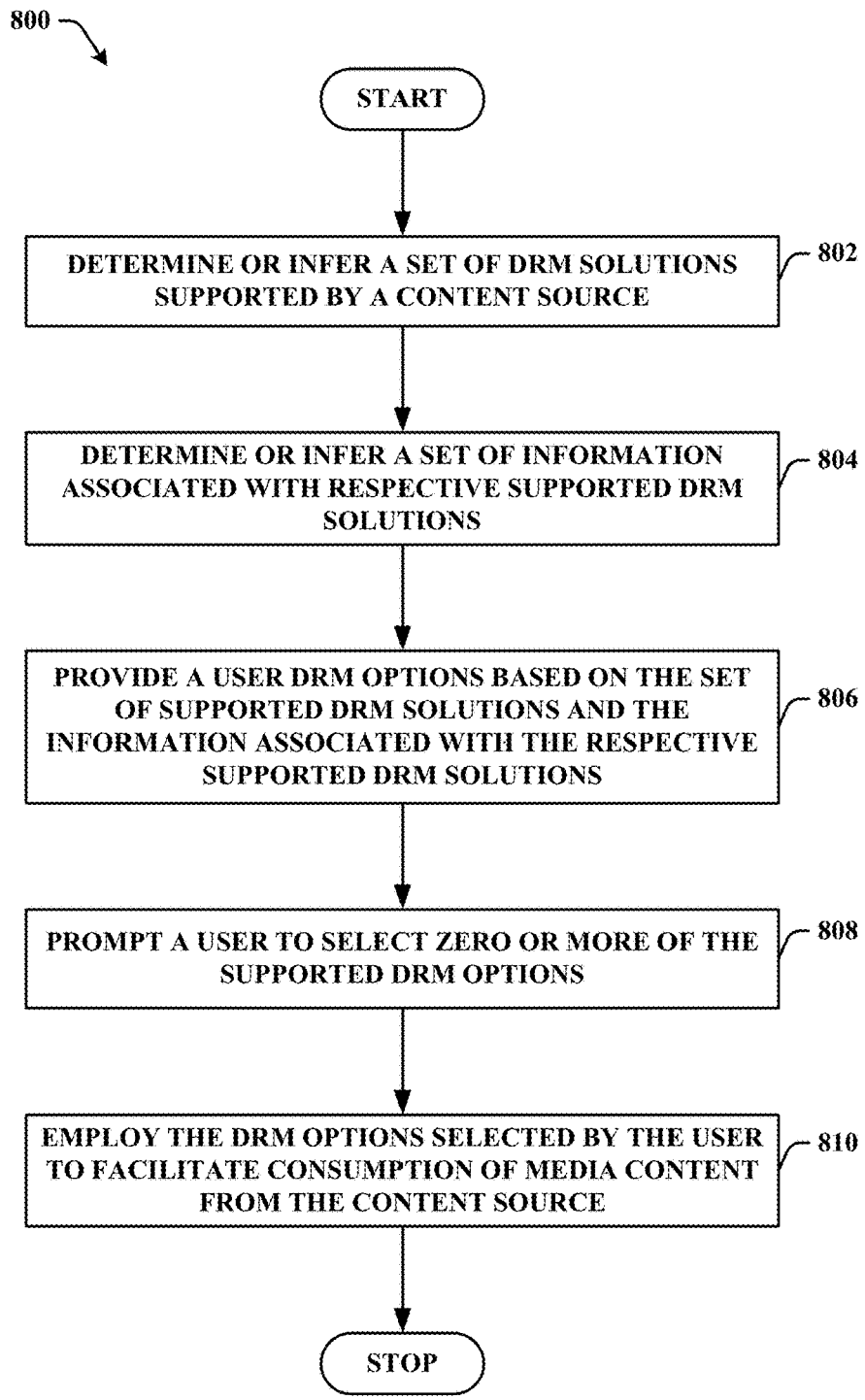

Non-Limiting Examples of Methods for Enhanced User Control For Content Protection Solutions FIGS. 7-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, illustrated is an example methodology 700 for enhanced user control for content protection solutions in accordance with various aspects described in this disclosure. At reference numeral 702, a media player determines, is provided, or is otherwise notified of a set of supported digital rights management (DRM) solutions (e.g., using the support component 202). For example, in one implementation, the media player can be provided with (or otherwise notified of) a set or list of supported DRM solutions supported by a content source. The set or list of supported DRM solutions can be obtained, acquired, or otherwise received from the content source. In one example, the set or list of supported DRM solutions can be determined or inferred based on a set of support criteria. The set of support criteria can include, but is not limited to, a content format, an encryption type, a configuration of the client device 106, and/or an identity of the content source. At reference numeral 704, a set of access rights corresponding to the respective supported DRM solutions are provided to the media player (e.g., using the support component 202). The access rights can include but are not limited to content limitations, quality limitations, and/or device limitations. The content limitations specify, identify, or otherwise indicate subsets of the content associated with a content source for which the content source enables access based in part on employment of respective DRM solutions. The quality limitations indicate content qualities (e.g., standard definition (SD), high definition (HD), etc.) for which the content source enables access based in part on employment of respective DRM solutions. The device limitations indicate devices (e.g., mobile phone A, etc.) and/or a set of predetermined device types (e.g., laptop, desktop, etc.) for which the content source enables access based in part on employment of respective DRM solutions.

At reference numeral 706, zero or more selections of DRM options based on the supported DRM solutions are obtained, acquired, or otherwise received by the content source (e.g., using the verification component 204). For example, in one implementation, an active DRM indicator is received from a media player and/or a supported DRM solution. At reference numeral 708, access for a subset of content associated with the content source is enabled (e.g., using the library component 206). For instance, access for a first subset of restricted content can be enabled, where the media player employs and/or a user selects a first supported DRM solution. As an additional or alternative example, access for a first quality of content (e.g., high definition, etc.) can be enabled, where the media player employs and/or a user selects a second supported DRM solution. As yet another example, access for a set of content for one or more predetermined device types can be enabled, where the media player employs and/or a user selects a third DRM solution.

FIG. 8 illustrates an example methodology 800 for enhanced user control for content protection solutions in accordance with various aspects described in this disclosure. At reference numeral 802, a set of DRM solutions supported by a content source (supported DRM solutions) are determined or inferred (e.g., using the options component 402). For example, in one implementation, a set or list of supported DRM solutions supported by the content source are obtained, acquired, or otherwise received from the content source. As an additional or alternative example, a set of supported DRM solutions are determined or inferred based on a set of support criteria. The set of support criteria can include but is not limited to a content format, an encryption type, a configuration of the client device 106, and/or an identity of the content source.

At reference numeral 804, information associated with the respective supported DRM options is determined or inferred (e.g., using the data component 404). The information can include but is not limited to a set of security policies and/or implications, a set of privacy policies, a set of limitations, a set of compatibility data, and/or a set of permissions required for respective supported DRM solutions. For example, in one implementation, information associated with respective supported DRM solutions is received from the content source. As an additional or alternative example, in one implementation, the data component determines or infers the sets of data or information based on a set of data criteria. The set of data criteria can include but is not limited to an identity of a DRM solution, a DRM solution type, files associated with a DRM solution, and/or execution of the DRM solution on the client device. For example, in one implementation, the data component 404 can determine the information based on a set of installation files associated with a DRM solution.

At reference numeral 806, a user is provided a set of DRM options based on the set of supported DRM solutions, and information associated with the respective supported DRM options (e.g., using the prompt component 406). The set of DRM options can include but is not limited to employing a supported DRM solution, and/or employing a subset of features associated with a supported DRM solution. For instance, a first supported DRM solution may have a set of X DRM features (or levels) that provide different levels of access for content provided by a content source, where X is a positive integer. At reference numeral 808, the user is prompted to select zero or more of the DRM options (e.g., using the prompt component 406).

At reference numeral 810, DRM options selected by the user are employed to facilitate consumption of media content from the content source (e.g., using the activation component 408). For instance, a first DRM option selected by the user can be employed and/or a set of DRM options not selected by the user can be disabled. In addition, the content source can be informed of the DRM options selected by the user. For instance, the zero or more DRM options selected by the user can be communicated to the content source.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
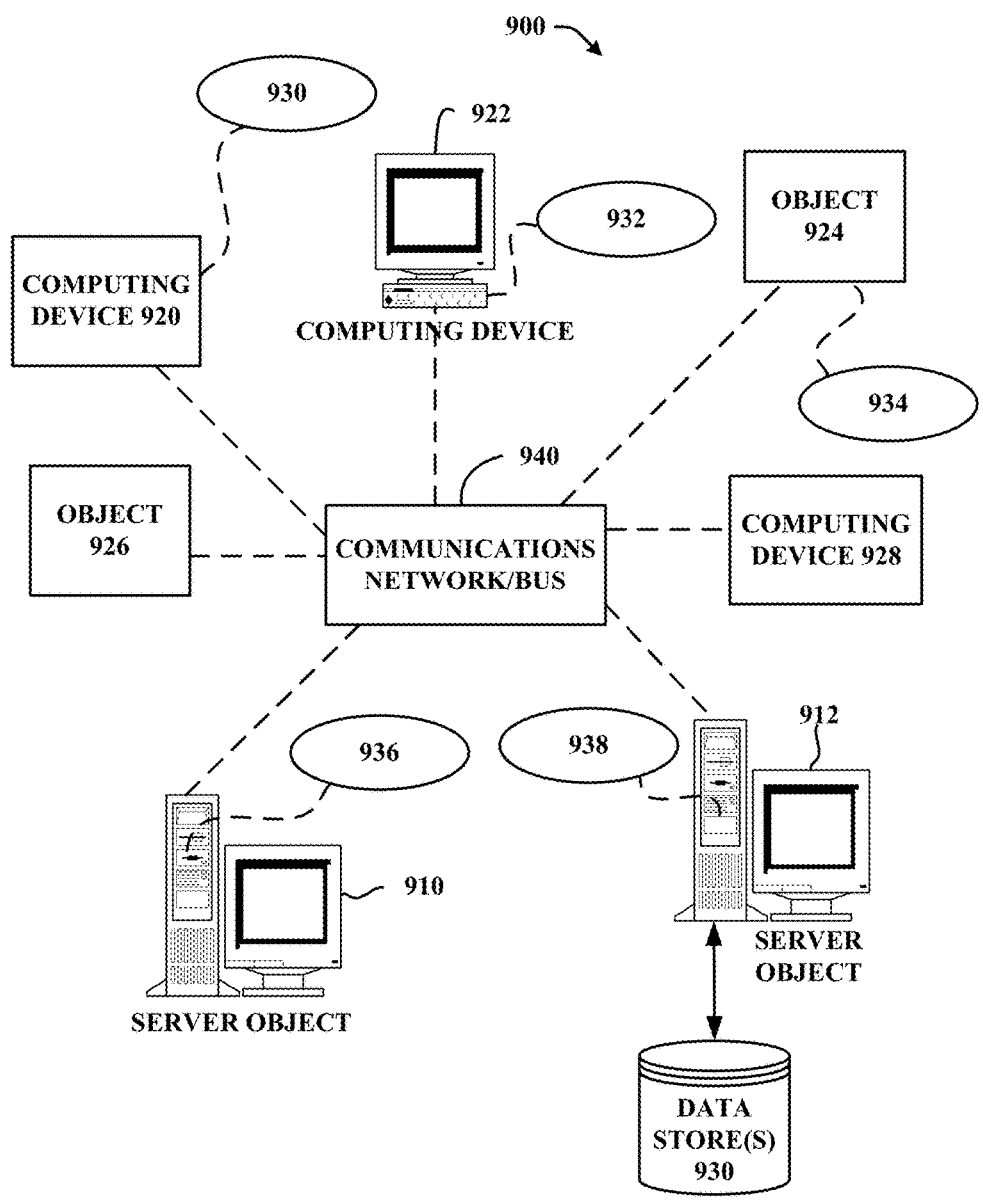
FIG. 9 is a block diagram representing an exemplary non-limiting networked environment in which the various embodiments can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as personal data assistants (PDAs), audio/video devices, mobile phones, MP3 players, personal computers, tablets, laptops, etc. For instance, the applications 930, 932, 934, 936, 938 can include the support component 202, verification component 204, library component 206, and/or media component 120.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store.

Figure 10:
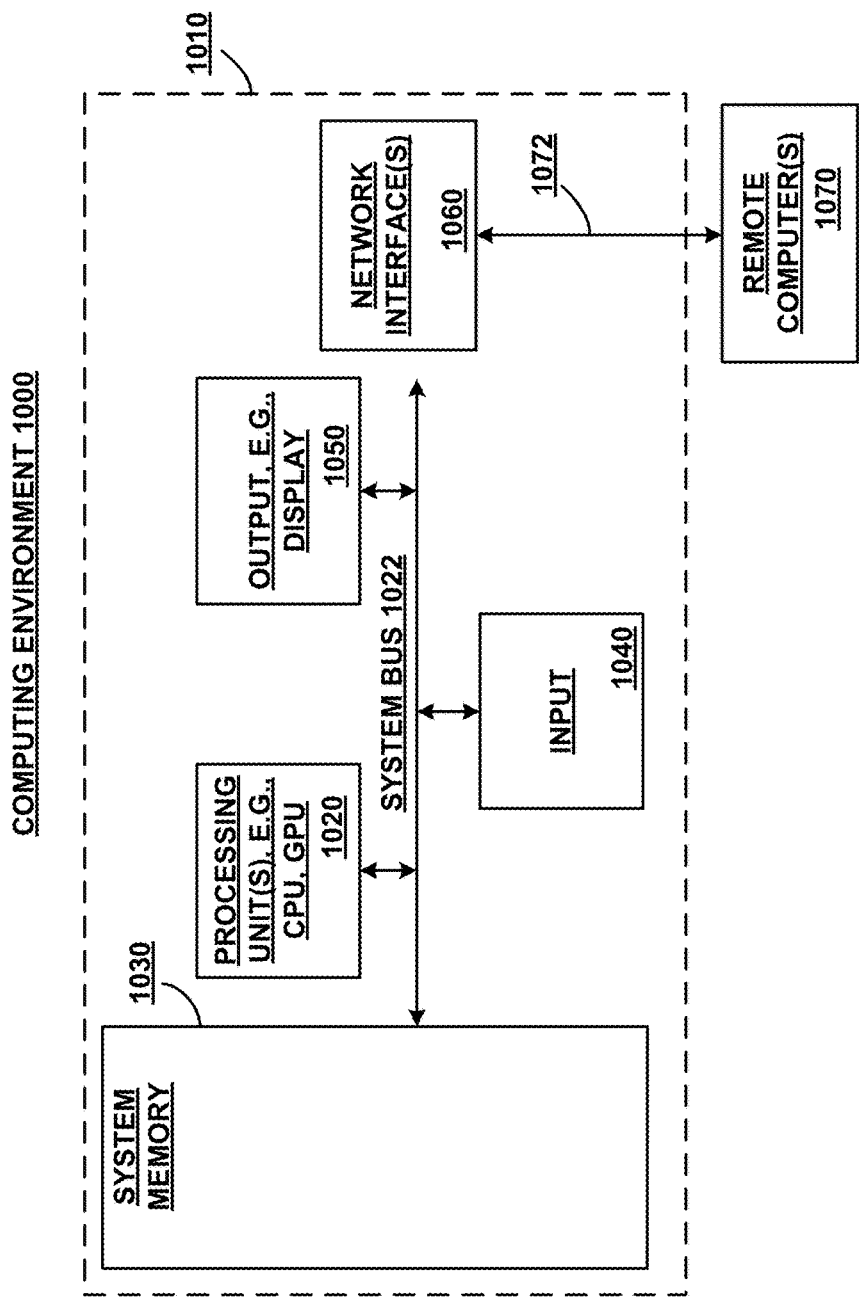
FIG. 10 is a block diagram representing an exemplary non-limiting computing system or operating environment in which the various embodiments may be implemented.

Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 to be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020. It is to be appreciated that the computer 1010 can be used in connection with implementing one or more of the systems or components shown and described in connection with FIGS. 1-5. For instance, the computer 1010 can include a content source 102, a client device 106, a media component 120, and/or a digital rights management solution 112. In addition, the computer 1010 can include different devices, such as smart phones, cell phones, personal digital assistants (PDAs), tablets, laptops, desktops, portable music players, video game systems, electronic readers (e-readers), global positioning systems (GPS), set-top boxes, televisions, etc.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   a memory storing computer executable instructions; and
   a processor configured to execute the computer executable instructions stored in the memory, the computer executable instructions, when executed by the processor, causing the processor to:
     determine a first set of digital rights management solutions installed on a client device, wherein the first set of digital rights management solutions are of distinct types and are separately installed on the client device;
     determine a second set of digital rights management solutions supported by a content source;
     determine respective information associated with the first or second set of digital rights management solutions;
     provide a presentation of a set of respective digital rights management options to a user of the client device, the set of respective digital rights management options corresponding to those of the first set of digital rights management solutions on the client device that are supported by the content source, and respective information associated with each of the set of respective digital rights management options;
     receive an input from the user of the client device indicating a selection of at least one of the set of respective digital rights management options;
     use a selected at least one digital rights management solution corresponding to the selected at least one of the set of respective digital rights management options on the client device to enable access for the client device to content associated with the content source; and
     disable digital rights management solutions in the first set of digital rights management solutions installed on the client device that are not selected.

2. The system of claim 1, further comprising computer executable instructions that when executed by the processor cause the processor to notify the content source of the selection of the at least one digital rights management option.

3. The system of claim 1, further comprising computer executable instructions that when executed by the processor cause the processor to determine the second set of digital rights management solutions supported by the content source based at least in part on a set of support criteria.

4. The system of claim 1, further comprising computer executable instructions that when executed by the processor cause the processor to receive, from the content source, the second set of digital rights management solutions supported by the content source.

5. The system of claim 1, further comprising computer executable instructions that when executed by the processor cause the processor to determine the respective information associated with the first or second set of digital rights management solutions based at least in part on a set of information criteria.

6. The system of claim 1, further comprising computer executable instructions that when executed by the processor cause the processor to receive, from the content source, the respective information associated with the first or second set of digital rights management solutions.

7. The system of claim 1, wherein the respective information associated with the first or second set of digital rights management solutions includes an invasiveness measurement.

8. The system of claim 1, wherein the respective information associated with the first or second set of digital rights management solutions includes a set of security policies associated with the first or second set of digital rights management solutions.

9. The system of claim 1, wherein the respective information associated with the first or second set of digital rights management solutions includes a set of privacy policies associated with the first or second set of digital rights management solutions.

10. The system of claim 1, wherein the respective information associated with the first or second set of digital rights management solutions includes a set of limitations associated with the first or second set of digital rights management solutions.

11. The system of claim 1, wherein the respective information associated with the first or second set of digital rights management solutions includes a set of permissions acquired by the first or second set of digital rights management solutions.

12. The system of claim 1, wherein the respective information associated with the first or second set of digital rights management solutions includes a set of compatibility data.

13. The system of claim 12, wherein the set of compatibility data includes data regarding at least one of compatibility of the second set of digital rights management solutions with other content sources, or compatibility of the second set of digital rights management solutions with the client device.

14. The system of claim 1, wherein the second set of digital rights management solutions are further supported by the client device.

15. A method, comprising:
- determining a first set of digital rights management solutions installed on a client device, wherein the first set of digital rights management solutions are of distinct types and are separately installed on the client device;
- determining a second set of digital rights management solutions supported by a content source;
- providing a presentation of a set of respective digital rights management options to a user of the client device, the set of respective digital rights management options corresponding to those of the first set of digital rights management solutions on the client device that are supported by the content source, and respective information associated with each of the set of respective digital rights management options;
- receiving an input from the user of the client device indicating a selection of at least one of the set of respective digital rights management options;
- using, by the client device, a selected at least one digital rights management solution corresponding to the selected at least one of the set of respective digital rights management options on the client device to enable access for the client device to content associated with the content source; and
- disabling digital rights management solutions in the first set of digital rights management solutions installed on the client device that are not selected.

16. The method of claim 15, further comprising receiving at least one of the first or second set of digital rights management solutions or the respective information from the content source.

17. The method of claim 15, further comprising determining the second set of digital rights management solutions supported by the content source based at least in part on a set of support criteria.

18. The method of claim 15, further comprising determining the respective information based at least in part on a set of information criteria.

19. The method of claim 15, further comprising notifying the content source of the selection of the at least one digital rights management option.

20. A non-transitory computer-readable medium having instructions stored thereon that, in response to execution, cause a system including a processor to perform operations comprising:
- determining a first set of digital rights management solutions installed on a client device, wherein the first set of digital rights management solutions are of distinct types and are separately installed on the client device;
- determining a second set of digital rights management solutions supported by a content source;
- providing a presentation of a set of digital rights management options to a user of the client device, the set of digital rights management options corresponding to those of the first set of digital rights management solutions on the client device that are supported by the content source, and respective information associated with each of the set of respective digital rights management options;
- receiving an input from the user of the client device indicating a selection of at least one of the set of digital rights management options;
- implementing using a selected at least one digital rights management solution corresponding to the selected at least one of the set of digital rights management options on the client device to enable access for the client device to content associated with the content source; and
- disabling digital rights management solutions in the first set of digital rights management solutions installed on the client device that are not selected.

21. The non-transitory computer-readable medium of claim 20, the operations further comprising receiving at least one of the first or second set of the plurality of digital rights management solutions or the respective information from the content source.

22. The non-transitory computer-readable medium of claim 20, the operations further comprising determining the second set of the plurality of digital rights management solutions supported by the content source based at least in part on a set of support criteria.

23. The non-transitory computer-readable medium of claim 20, the operations further comprising determining the respective information based at least in part on a set of information criteria.

* * * * *